US012188280B2

(12) United States Patent
Park

(10) Patent No.: US 12,188,280 B2
(45) Date of Patent: Jan. 7, 2025

(54) PASSENGER SAFE EXIT ASSIST DEVICE AND METHOD THEREOF

(71) Applicants: HYUNDAI MOTOR COMPANY, Seoul (KR); KIA CORPORATION, Seoul (KR)

(72) Inventor: Deok Ho Park, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 582 days.

(21) Appl. No.: 17/530,165

(22) Filed: Nov. 18, 2021

(65) Prior Publication Data

US 2022/0195783 A1 Jun. 23, 2022

(30) Foreign Application Priority Data

Dec. 22, 2020 (KR) ........................ 10-2020-0181032

(51) Int. Cl.
*E05F 15/40* (2015.01)

(52) U.S. Cl.
CPC ........... *E05F 15/40* (2015.01); *E05Y 2400/44* (2013.01); *E05Y 2400/45* (2013.01); *E05Y 2400/54* (2013.01); *E05Y 2900/531* (2013.01)

(58) Field of Classification Search
CPC . E05F 15/40; E05F 15/70; E05F 15/42; E05F 15/73; E05Y 2400/44; E05Y 2400/45; E05Y 2400/54; E05Y 2900/531; E05Y 2400/36; E05Y 2400/53; B60Q 9/008; B60N 5/00; B60J 5/047; B60R 21/0134
See application file for complete search history.

(56) References Cited

U.S. PATENT DOCUMENTS

| | | | | |
|---|---|---|---|---|
| 8,938,337 B2 * | 1/2015 | Nakakura | G01S 17/42 701/1 |
| 9,361,803 B2 * | 6/2016 | Lee | B62D 15/0285 |
| 10,467,789 B2 * | 11/2019 | Watanabe | B60T 7/12 |
| 10,684,625 B2 * | 6/2020 | Miller | B60T 8/17 |
| 2010/0082206 A1 * | 4/2010 | Kollar | E05F 15/43 701/49 |
| 2017/0234054 A1 * | 8/2017 | Kumar | E05F 15/73 49/324 |

FOREIGN PATENT DOCUMENTS

| | | | | |
|---|---|---|---|---|
| CN | 111593991 A * | 8/2020 | E05F 15/40 |
| CN | 114402372 A * | 4/2022 | B60R 25/01 |
| DE | 102004061686 A1 * | 7/2006 | E05C 17/305 |
| KR | 20190042313 A | 4/2019 | |
| KR | 20210076667 A | 6/2021 | |

* cited by examiner

*Primary Examiner* — Justin Holmes
(74) *Attorney, Agent, or Firm* — Lempia Summerfield Katz LLC

(57) ABSTRACT

A passenger safe exit assist device and a method thereof obtain information of an obstacle around a vehicle and a speed at which the door of the vehicle is opened, set a virtual first line along the obstacle, and control the speed at which the door is opened, based on at least one of the first line or the speed. The device and method provide a customer with various safe exit modes such that the customer freely selects a mode and experiences alighting safely from the vehicle.

20 Claims, 7 Drawing Sheets

PASSENGER SAFE EXIT ASSIST DEVICE AND METHOD THEREOF

CROSS-REFERENCE TO RELATED APPLICATION

This application claims the benefit of priority to Korean Patent Application No. 10-2020-0181032, filed in the Korean Intellectual Property Office on Dec. 22, 2020, the entire contents of which are incorporated herein by reference.

TECHNICAL FIELD

The present disclosure relates to a passenger safe exit assist device and a method thereof, and more particularly, relates to an apparatus for controlling a door of a vehicle when a passenger safely alights from the vehicle and to a method thereof.

BACKGROUND

Due to a narrow parking space in a parking lot, it is often difficult to freely open the door of a vehicle after the vehicle is parked because the vehicle is close to a vehicle or structure next to the vehicle upon parking. To address such problems, devices for assisting a passenger to alight, e.g., exit, safely have been developed.

Particularly, in the process of assisting parking, there is a technology of capturing an image behind the vehicle by means of a rear view camera to discover a parking space and outputting an alert to assist parking, when there is a risk of collision depending on a distance between the vehicle and an obstacle. Such a technology may set a virtual line corresponding to an obstacle around the vehicle upon parking.

SUMMARY

However, because there is a technology of using the virtual line in the process of parking, but there is no technology of using the virtual line in the process of opening the door when a passenger alight, there is a need for such a technology.

The present disclosure has been made to solve the above-mentioned problems occurring in the prior art while advantages achieved by the prior art are maintained intact.

An aspect of the present disclosure provides an apparatus for controlling a speed of the door to assist a passenger to alight safely when the passenger alights. Another aspect of the present disclosure provides a method thereof.

Another aspect of the present disclosure provides an apparatus for controlling a speed at which the door is opened, when a passenger manually opens the door when the passenger alights from the vehicle, to prevent the door from being damaged due to a collision between the door and the surrounding obstacle. Another aspect of the present disclosure provides a method thereof.

Another aspect of the present disclosure provides an apparatus for setting a parking assist line depending on a degree to which the door is opened, which is determined according to a driver, to provide convenience in the process of opening the door when the passenger alights. Another aspect of the present disclosure provides a method thereof.

Another aspect of the present disclosure provides an apparatus for allowing a driver to select a mode where a degree to which the door is opened is differently set, depending to a situation, and adjusting the degree to which the door is opened when the driver alights depending on the mode selected by the driver. Another aspect of the present disclosure provides a method thereof.

Another aspect of the present disclosure provides an apparatus for conveniently selecting a mode in various methods, in the process where the driver selects the mode where the degree to which the door is opened is differently set. Another aspect of the present disclosure provides a method thereof.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a passenger safe exit assist device may include a sensor device that obtains information of an obstacle around a vehicle and a speed at which a door of the vehicle is opened and may include a controller that sets a virtual first line along the obstacle and controls the speed at which the door is opened, based on at least one of the first line or the speed.

In an embodiment, the controller may determine whether to control the speed at which the door is opened, depending on whether the ratio of a distance between the vehicle and the first line to a distance between the vehicle and a second line set based on a degree to which the door of the vehicle is maximally opened is greater than a first reference ratio.

In an embodiment, the controller may apply torque in a direction opposite to a direction where the door is opened to control the speed at which the door is opened, when the speed is greater than a reference speed.

In an embodiment, the sensor device may obtain the acceleration at which the door of the vehicle is opened. The controller may increase torque in a direction opposite to a direction where the door is opened, depending on a degree to which the door is opened, when the acceleration is greater than reference acceleration.

In an embodiment, the controller may automatically open the door of the driver's seat to the first line, depending on a signal for automatically opening the door of the driver's seat.

In an embodiment, the controller may open the door of the driver's seat at a specific speed, when the ratio of a distance between the vehicle and the first line to a distance between the vehicle and a second line set based on a degree to which the door of the vehicle is maximally opened is greater than a second reference ratio. The controller may open the door of the driver's seat at a predetermined speed depending on the ratio of the distance between the vehicle and the first line to the distance between the vehicle and the second line, when the ratio of the distance between the vehicle and the first line to the distance between the vehicle and the second line is not greater than the second reference ratio.

In an embodiment, the controller may control to apply torque in a direction opposite to a direction where the door of the driver's seat is opened, when a force is applied in the direction where the door of the driver's seat is opened, in a state where the door of the driver's seat is opened to the first line.

In an embodiment, the controller may set a third line based on a degree to which the door of the vehicle is opened with regard to safe exit and may automatically open a different door rather than the door of the driver's seat to the third line, depending on a signal for automatically opening the different door.

In an embodiment, the controller may apply torque in a direction opposite to a direction where the different door rather than the door of the driver's seat is opened and may open the different door rather than the door of the driver's seat to the first line, when a force is applied in the direction where the different door rather than the door of the driver's seat is opened, in a state where the different door rather than the door of the driver's seat is opened to the third line.

In an embodiment, the controller may set the third line based on a degree to which the door is opened, the degree corresponding to a mode selected among a mode where the degree to which the door is opened is set according to a reference body type, a mode where the degree to which the door is opened is set according to a front body type of a driver, and a mode where the degree to which the door is opened is set according to a side body type of the driver.

In an embodiment, the degree to which the door is opened may include the degree being calculated such that an area in which the reference body type or the front body type is reflected passes, when the mode where the degree to which the door is opened is set according to the reference body type or the front body type of the driver is selected. The controller may set the third line based on the degree to which the door is opened, the degree corresponding to the selected mode, and a degree to which the door is additionally opened, the degree being set to prevent a contact with an obstacle when the door is opened.

In an embodiment, the controller may set the third line based on only a degree to which the door is opened according to the side body type of the driver without regard to a distance between the vehicle and the obstacle, when the mode where the degree to which the door is opened is set according to the side body type of the driver is selected.

In an embodiment, the controller may set the selected mode by means of at least one of the number of times a mode selection button is pushed, a time when the mode selection button is pushed, or a user selection mode (USM).

In an embodiment, the controller may store body type information according to a user in a memory and may set the degree to which the door is opened according to the front body type of the driver and the degree to which the door is opened according to the side body type of the driver, using the body type information stored in the memory.

According to another aspect of the present disclosure, a passenger safe exit assist method may include obtaining information of an obstacle around a vehicle and a speed at which a door of the vehicle is opened, setting a virtual first line along the obstacle, and controlling the speed at which the door is opened, based on at least one of the first line or the speed.

In an embodiment, the controlling of the speed at which the door is opened, based on the at least one of the first line or the speed may include determining whether to control the speed at which the door is opened, depending on whether the ratio of a distance between the vehicle and the first line to a distance between the vehicle and a second line set based on a degree to which the door of the vehicle is maximally opened is greater than a first reference ratio.

In an embodiment, the passenger safe exit assist method may further include obtaining an acceleration at which the door of the vehicle is opened. The controlling of the speed at which the door is opened, based on the at least one of the first line or the speed may include applying torque in a direction opposite to a direction where the door is opened to control the speed at which the door is opened, when the speed is greater than a reference speed and increasing torque in the direction opposite to the direction where the door is opened, depending on a degree to which the door is opened, when the acceleration is greater than reference acceleration.

In an embodiment, the controlling of the speed at which the door is opened, based on the at least one of the first line or the speed may include opening the door of the driver's seat at a specific speed, when the ratio of a distance between the vehicle and the first line to a distance between the vehicle and a second line set based on a degree to which the door of the vehicle is maximally opened is greater than a second reference ratio, depending on a signal for automatically opening the door of the driver's seat. The controlling of the speed at which the door is opened may further include opening the door of the driver's seat at a predetermined speed depending on the ratio of the distance between the vehicle and the first line to the distance between the vehicle and the second line, when the ratio of the distance between the vehicle and the first line to the distance between the vehicle and the second line is not greater than the second reference ratio. The controlling of the speed at which the door is opened may further include applying torque in a direction opposite to a direction where the door of the driver's seat is opened, when a force is applied in the direction where the door of the driver's seat is opened, in a state where the door of the driver's seat is opened to the first line.

In an embodiment, the passenger safe exit assist method may further include setting a third line based on a degree to which the door of the vehicle is opened with regard to safe exit. The controlling of the speed at which the door is opened, based on the at least one of the first line or the speed may include automatically opening a different door rather than the door of the driver's seat to the third line, depending on a signal for automatically opening the different door rather than the door of the driver's seat. The controlling of the speed at which the door is opened may further include applying torque in a direction opposite to a direction where the different door rather than the door of the driver's seat is opened and opening the different door rather than the door of the driver's seat to the first line, when a force is applied in the direction where the different door rather than the door of the driver's seat is opened, in a state where the different door rather than the door of the driver's seat is opened to the third line.

The setting of the third line based on the degree to which the door of the vehicle is opened with regard to the safe exit may include setting the third line based on a degree to which the door is opened. The degree may correspond to a mode selected among a mode where the degree to which the door is opened is set according to a reference body type, a mode where the degree to which the door is opened is set according to a front body type of a driver, and a mode where the degree to which the door is opened is set according to a side body type of the driver.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
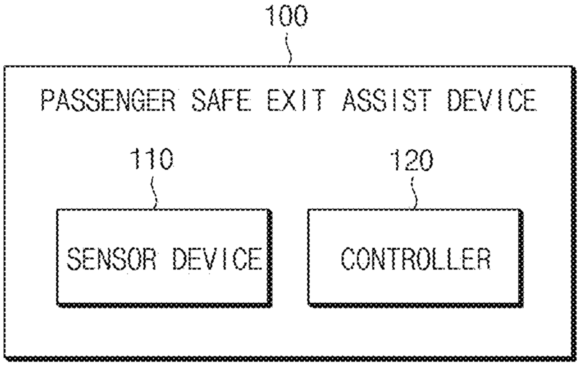
FIG. 1 is a block diagram illustrating a passenger safe exit assist device according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings consistent with the contextual meanings in the relevant field of art. Such terms are not to be interpreted as having ideal or excessively formal meanings unless clearly defined as having such in the present application.

When a component, device, element, or the like of the present disclosure is described as having a purpose or performing an operation, function, or the like, the component device, or element should be considered herein as being "configured to" meet that purpose or to perform that operation or function.

Hereinafter, embodiments of the present disclosure are described in detail with reference to FIGS. 1-7.

FIG. 1 is a block diagram illustrating a passenger safe exit assist device according to an embodiment of the present disclosure.

Referring to FIG. 1, a passenger safe exit assist device 100 may include a sensor device 110 and a controller 120.

The passenger safe exit assist device 100 may be integrally configured with a vehicle or may be implemented as a separate configuration in the form of being installed/attached to the vehicle. Alternatively, a part of the passenger safe exit assist device 100 may be integrally configured with the vehicle or the other may be implemented as a separate configuration in the form of being installed/attached to the vehicle.

The sensor device 110 may obtain information of an obstacle around the vehicle and a speed at which a door of the vehicle is opened.

As an example, the sensor device 110 may obtain acceleration at which the door of the vehicle is opened, may sense an obstacle around the vehicle, and may sense a body type of a driver.

As an example, the sensor device 110 may be directly or indirectly connected with the controller 120 through wireless or wired communication to deliver the sensed information to the controller 120.

The controller 120 may perform the overall control such that respective components may normally perform their own functions. Such a controller 120 may be implemented in the form of hardware, may be implemented in the form of software, or may be implemented in the form of a combination thereof. The controller 120 may be implemented as, but not limited to, a microprocessor. In addition, the controller 120 may perform a variety of data processing, calculation, and the like described below.

The controller 120 may set a virtual first line along the obstacle around the vehicle and may control the speed at which the door is opened, based on at least one of the first line or the speed. Herein, the first line may include a line connecting the outside of surrounding obstacles including another vehicle, a mounted object, persons, and animals, which are present around the vehicle.

As an example, the controller 120 may set a second line based on the vehicle and a degree to which the door of the vehicle is maximally opened and may determine whether to control the speed at which the door is opened, depending on whether the ratio of a distance between the vehicle and the first line to a distance between the vehicle and the second line is greater than a first reference ratio. Herein, the second line may include an outermost line of the door maximally opened when a passenger alights from the vehicle.

As an example, the controller 120 may perform a variety of calculations by means of pieces of information transmitted from the sensor device 110 and may set virtual first to third lines. Herein, the third line may include an outermost line of the door opened to the point that the door does not collide with a surrounding obstacle present around the vehicle when the passenger alights from the vehicle.

As an example, the controller 120 may set the first line along an obstacle around the vehicle. The first line may be used in a process of assisting parking.

As an example, the controller 120 may set the second line based on a degree to which the door of the vehicle is maximally opened. The second line may be used in a process of assisting parking.

As an example, the controller 120 may set the third line based on a degree to which the door of the vehicle is opened with regard to safe exit.

In detail, the controller 120 may set the third line based on a degree to which the door is opened, which is determined according to a safe exit mode input by a user. The third line may be used in a process of assisting parking.

The controller 120 may apply torque in a direction opposite to a direction where the door is opened, may increase or decrease torque in the direction opposite to the direction where the door is opened, and may control such that the door is opened to a specific degree.

Figure 2:
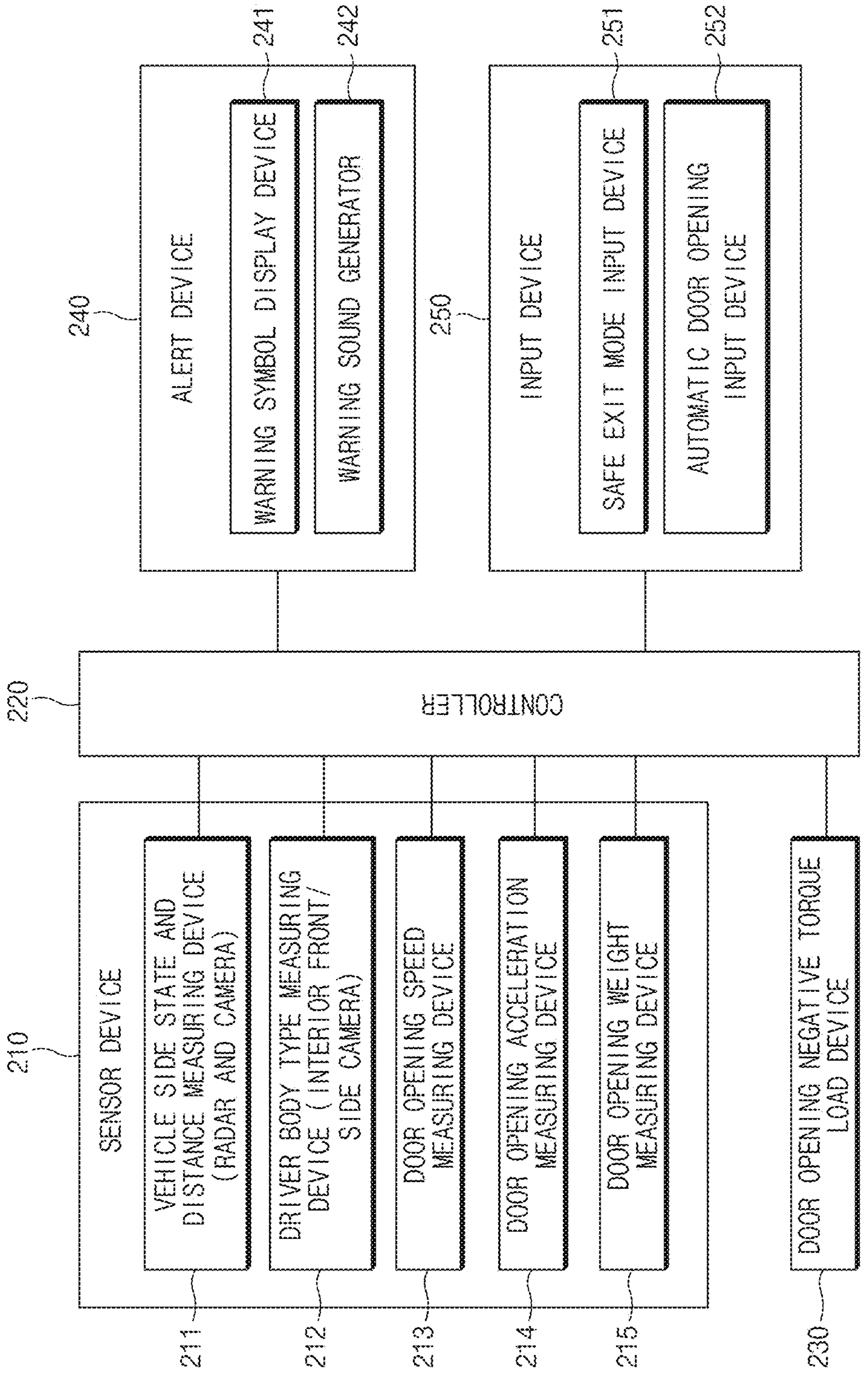
FIG. 2 is a block diagram illustrating a detailed configuration of a passenger safe exit assist device according to an embodiment of the present disclosure.

FIG. 2 is a block diagram illustrating a detailed configuration of a passenger safe exit assist device according to an embodiment of the present disclosure.

A sensor device 210 may include a vehicle side state and distance measuring device 211, a driver body type measuring device 212, a door opening speed measuring device 213, a door opening acceleration measuring device 214, and a door opening weight measuring device 215.

The vehicle side state and distance measuring device 211 may recognize an obstacle around the vehicle in a side direction and may measure a distance between a door of the vehicle and the obstacle.

As an example, the vehicle side state and distance measuring device 211 may include at least one of a radar or a camera.

The driver body type measuring device 212 may measure at least one of a front body type and a side body type of a driver by means of the camera.

As an example, the driver body type measuring device 212 may include at least one of a driver front camera or a driver side camera provided in the vehicle.

The door opening speed measuring device 213 may obtain a speed at which the door of the vehicle is opened.

The door opening acceleration measuring device 214 may obtain acceleration at which the door of the vehicle is opened.

The door opening weight measuring device 215 may measure a force applied in a direction where the door of the vehicle is opened.

A controller 220 may be directly or indirectly connected with the vehicle side state and distance measuring device 211, the driver body type measuring device 212, the door opening speed measuring device 213, the door opening acceleration measuring device 214, the door opening weight measuring device 215, a door opening negative torque load device 230, an alert device 240, and an input device 250 through wireless or wired communication to receive information or transmit a control signal, thus controlling the components.

The door opening negative torque load device 230 may apply a negative torque in a direction opposite to a direction where the door of the vehicle is opened.

As an example, the door opening negative torque load device 230 may receive a control signal from the controller 220 and may apply the negative torque in the direction opposite to the direction where the door of the vehicle is opened.

The alert device 240 may include at least one of a warning symbol display device 241 or a warning sound generator 242.

The warning symbol display device 241 may receive an alert control signal from the controller 220 and may display or turn on/off a warning symbol by means of at least one of a cluster or an audio, video, navigation (AVN) of the vehicle.

The warning sound generator 242 may receive an alert control signal from the controller 220 and may output a warning sound by means of at least one of a horn, an audio, or an AVN of the vehicle.

The input device 250 may include a safe exit mode input device 251 and an automatic door opening input device 252.

The safe exit mode input device 251 may receive a safe exit mode of the vehicle from a user.

As an example, the safe exit mode input device 251 may receive a safe exit mode from the user, through a mode selection button and a user selecting mode (USM).

As an example, the safe exit mode input device 251 may receive the safe exit mode from the user, through the number of times the mode selection button is pushed or a time when the mode selection button is pushed.

In detail, when the mode selection button of the safe exit mode input device 251 is pushed once, the controller 220 may determine that a mode where a degree to which the door is opened is set according to a reference body type is input. When the mode selection button is pushed two times, the controller 220 may determine that a mode where a degree to which the door is opened is set according to a front body type of a driver is input. When the mode selection button is pushed three times, the controller 220 may determine that a mode where a degree to which the door is opened is set according to a side body type of the driver is input.

As an example, when the safe exit mode input device 251 receives an owner mode, the controller 220 may set a degree to which the door is opened according to the front body type of the driver and a degree to which the door is opened according to the side body type of the driver, using body type information stored in a memory.

To this end, the controller 220 may store body type information according to the user in the memory in advance.

When the owner mode is selected, the controller 220 may immediately use a previously stored value without measuring a body type by means of a camera. When the owner mode is not selected, the controller 220 may use a degree to which the door is opened, which is set with regard to a body type of the driver.

The automatic door opening input device 252 may receive a signal for automatically opening the door of the vehicle from the user.

As an example, the automatic door opening input device 252 may include at least one of an auto door open switch or an auto door open handle.

As an example, the automatic door opening input device 252 may detect manipulation of at least one of the auto door open switch or the auto door open handle and may receive a signal for automatically opening the door from the user.

Figure 3:
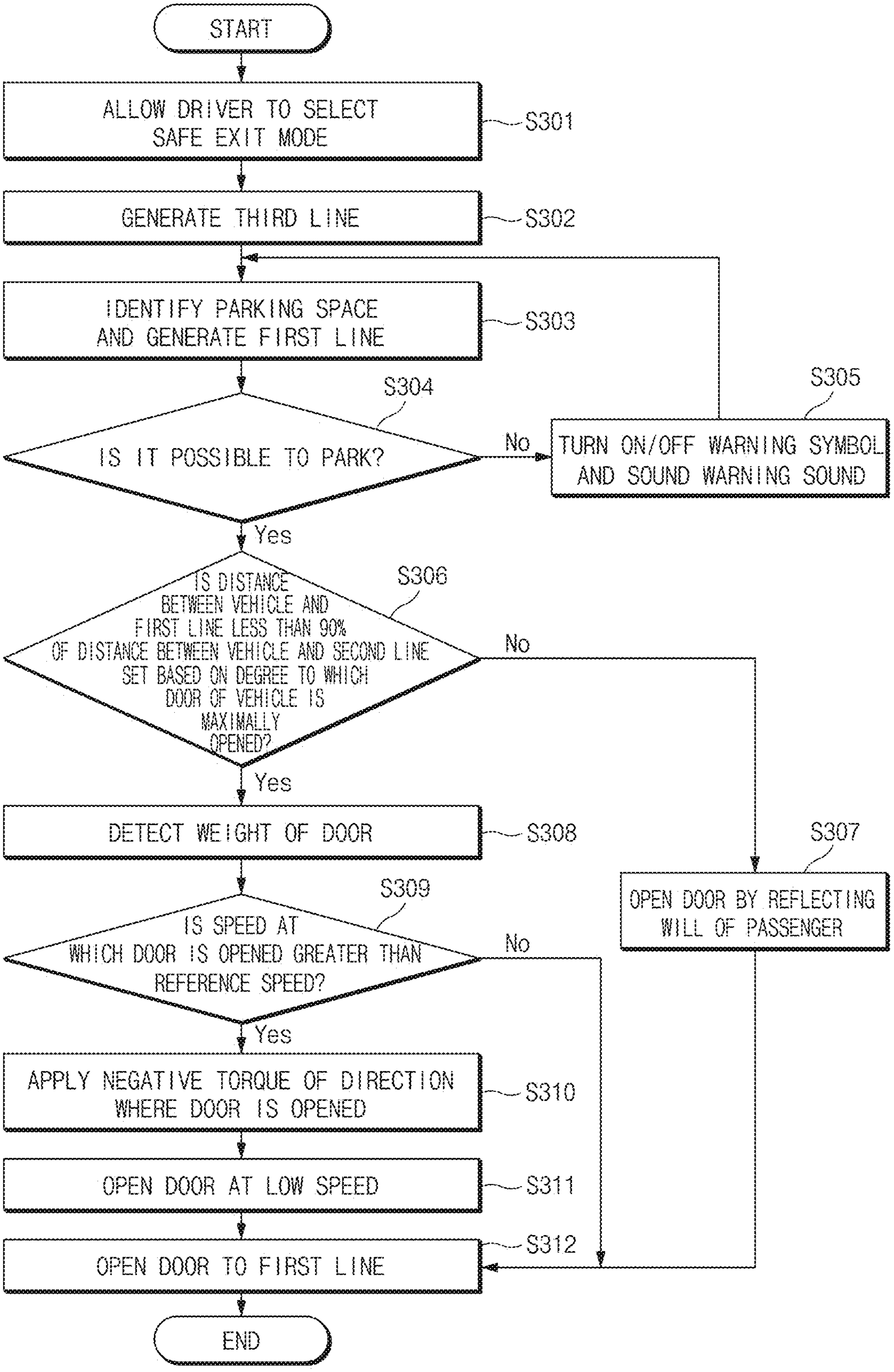
FIG. 3 is a flowchart illustrating a process of controlling a speed of a door in a manual mode in a passenger safe exit assist device according to an embodiment of the present disclosure.

FIG. 3 is a flowchart illustrating a process of controlling a speed of a door in a manual mode in a passenger safe exit assist device according to an embodiment of the present disclosure.

Referring to FIG. 3, in S301, a passenger safe exit assist device 100 of FIG. 1 may determine that a driver selects a safe exit mode.

As an example, a controller 220 of FIG. 2 may identify a safe exit mode selected by the driver among a among a number of modes. One mode may be where a degree to which the door is opened is set according to a reference body type. Another mode may be where a degree to which the door is opened is set according to a front body type of the driver. Another mode may be where a degree to which the door is opened is set according to a side body type of the driver, by means of a safe exit mode input device 251 of FIG. 2.

After determining that the driver selects the safe exist mode, in S302, the passenger safe exit assist device 100 may generate a third line.

As an example, the controller 220 may set the third line based on a degree to which the door is opened, corresponding to a mode selected from among a number of modes. In one example, these modes may include the mode where the degree to which the door is opened is set according to the reference body type, the mode where the degree to which the door is opened is set according to the front body type of the driver, and the mode where the degree to which the door is opened is set according to the side body type of the driver.

As an example, when the mode where the degree to which the door is opened is set according to the reference body type or the front body type of the driver is selected, the controller 220 may set the third line based on a degree to which the door is opened, which is calculated such that an area where the reference body type or the front body type is reflected may pass, and a degree to which the door is additionally opened, which is set to prevent a contact with an obstacle when the door is opened.

As an example, when the mode where the degree to which the door is opened is set according to the side body type of the driver is selected, the controller 220 may set the third line based on only a degree to which the door is opened according to the side body type of the driver without regard to a distance between the vehicle and the obstacle.

After generating the third line, in S303, the passenger safe exit assist device 100 may identify a parking space and may generate a first line.

As an example, the controller 220 may identify the parking space by means of an image around the vehicle, which is obtained by means of a camera.

As an example, the controller 220 may generate a virtual first line along an obstacle around the parking space.

After identifying the parking space and generating the first line, in S304, the passenger safe exit assist device 100 may determine whether it is possible to park.

As an example, the controller 220 may determine whether it is possible to park, based on whether an expected parking path of the vehicle and the first line are overlapped with each other.

When it is determined that it is impossible to park, in S305, the passenger safe exit assist device 100 may turn on/off a warning symbol and may sound a warning sound.

As an example, the controller 220 may deliver an alert signal to an alert device 240 of FIG. 2 to display or turn on/off a warning symbol by means of at least one of a cluster or an AVN and to output a warning sound by means of at least one of a horn, an audio, or an AVN of the vehicle.

After turning on/off the warning symbol and sounding the warning sound, the passenger safe exit assist device 100 may perform S303 again.

When it is determined that it is possible to park, in S306, the passenger safe exit assist device 100 may determine whether the distance between the vehicle and the first line is less than 90% of a distance between the vehicle and a second line set based on a degree to which the door of the vehicle is maximally opened.

As an example, the controller 220 may set the second line based on the degree to which the door of the vehicle is maximally opened and may determine whether the ratio of the distance between the vehicle and the first line to the distance between the vehicle and the second line is greater than a first reference ratio.

Herein, the numerical value 90% may be a value set randomly to give an example of the first reference ratio and may be actually set to another ratio.

When it is determined that the distance between the vehicle and the first line is not less than 90% of the distance between the vehicle and the second line set based on the degree to which the door of the vehicle is maximally opened, in S307, the passenger safe exit assist device 100 may control such that the door is opened by reflecting the will of a passenger (i.e., opened by a passenger without torque applied by the passenger safe exit device).

As an example, because a space where it is able to open the door is sufficient, the controller 220 may fail to provide torque to the door, such that the door is opened according to the will of the passenger.

When it is determined that the distance between the vehicle and the first line is less than 90% of the distance between the vehicle and the second line, in S308, the passenger safe exit assist device 100 may detect a weight applied to the door.

As an example, the controller 220 may detect a weight applied to the door, by means of a door opening weight measuring device 215 of FIG. 2.

After detecting the weight applied to the door, in S309, the passenger safe exit assist device 100 may determine whether the speed at which the door is opened is greater than a reference speed.

As an example, the controller 220 may obtain the speed at which the door is opened by means of a door opening speed measuring device 213 of FIG. 2 and may compare the obtained speed with a reference speed stored in a memory to determine whether the speed at which the door is opened is greater than the reference speed.

When it is determined that the speed at which the door is opened is not greater than the reference speed, in S312, the passenger safe exit assist device 100 may control such that the door is opened to the first line.

As an example, when it is determined that there is no damage to a surrounding obstacle and the vehicle as the passenger slowly opens the door, the controller 220 may control such that the door is opened to the first line without applying torque to the door.

When it is determined that the speed at which the door is opened is greater than the reference speed, in S310, the passenger safe exit assist device 100 may apply negative torque of a direction where the door is opened.

As an example, when the speed at which the door is opened is greater than the reference speed, the controller 220 may apply torque in a direction opposite to a direction where the door is opened to control a speed at which the door is opened.

As an example, when the speed at which the door is opened is greater than the reference speed, the controller 220 may deliver a control signal to a door opening negative torque load device 230 of FIG. 2 and may assign torque in a direction opposite to the direction where the door is opened.

After assigning the negative torque of the direction where the door is opened, in S311, the passenger safe exit assist device 100 may control such that the door is opened at a low speed.

As an example, the controller 220 may assign torque in the direction opposite to the direction where the door is opened to control such that the door is opened at a reference speed.

After controlling such that the door is opened at the low speed, in S312, the passenger safe exit assist device 100 may control such that the door is opened to the first line.

Figure 4:
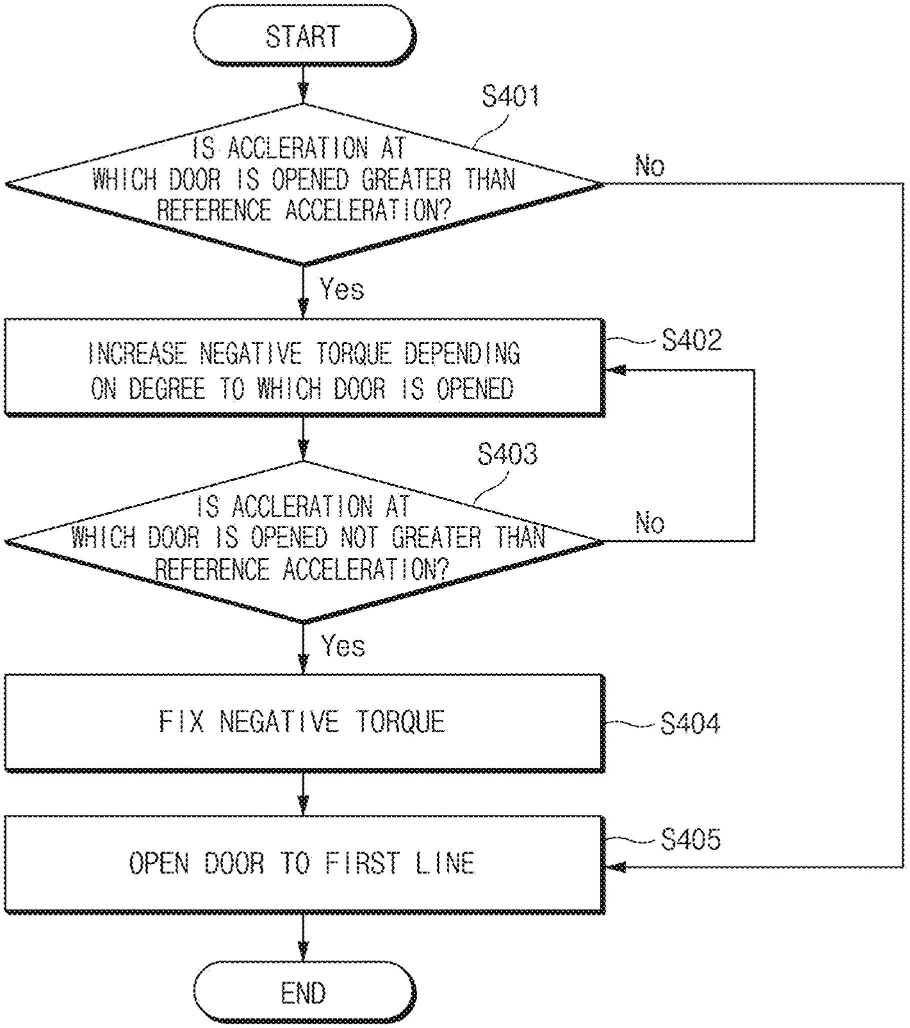
FIG. 4 is a flowchart illustrating a process of controlling a speed of a door depending on acceleration of the door in a manual mode in a passenger safe exit assist device according to an embodiment of the present disclosure.

FIG. 4 is a flowchart illustrating a process of controlling a speed of a door depending on acceleration of the door in a manual mode in a passenger safe exit assist device according to an embodiment of the present disclosure.

Referring to FIG. 4, in S401, a passenger safe exit assist device 100 of FIG. 1 may determine whether acceleration at which the door is opened is greater than reference acceleration.

As an example, a controller 220 of FIG. 2 may obtain acceleration at which the door is opened by means of a door opening acceleration measuring device 214 of FIG. 2 and may compare the obtained acceleration with reference acceleration stored in a memory to determine whether the acceleration at which the door is opened is greater than the reference acceleration.

When it is determined that the acceleration at which the door is opened is not greater than the reference acceleration, in S405, the passenger safe exit assist device 100 may control such that the door is opened to a first line.

As an example, when the acceleration at which the door is opened is not greater than the reference acceleration, the controller 220 may control such that the door is opened to the first line, without increasing torque applied to the door.

When it is determined that the acceleration at which the door is opened is greater than the reference acceleration, in S402, the passenger safe exit assist device 100 may increase a negative torque depending on a degree to which the door is opened.

As an example, the controller 220 may deliver a control signal to a door opening negative torque load device 230 of FIG. 2 to increase a negative torque depending on a degree to which the door is opened.

After increasing the negative torque depending on the degree to which the door is opened, in S403, the passenger safe exit assist device 100 may determine whether the acceleration at which the door is opened is not greater than the reference acceleration.

As an example, the controller 220 may obtain the acceleration at which the door is opened by means of the door opening acceleration measuring device 214 and may compare the obtained acceleration with the reference acceleration stored in the memory to determine whether the acceleration at which the door is opened is greater than the reference acceleration, in the same manner as that in S401.

When it is determined that the acceleration at which the door is opened is greater than the reference acceleration, the passenger safe exit assist device 100 may perform S402 again.

When it is determined that the acceleration at which the door is opened is not greater than the reference acceleration, in S404, the passenger safe exit assist device 100 may fix the negative torque.

After fixing the negative torque, in S405, the passenger safe exit assist device 100 may control such that the door is opened to the first line.

Figure 5:
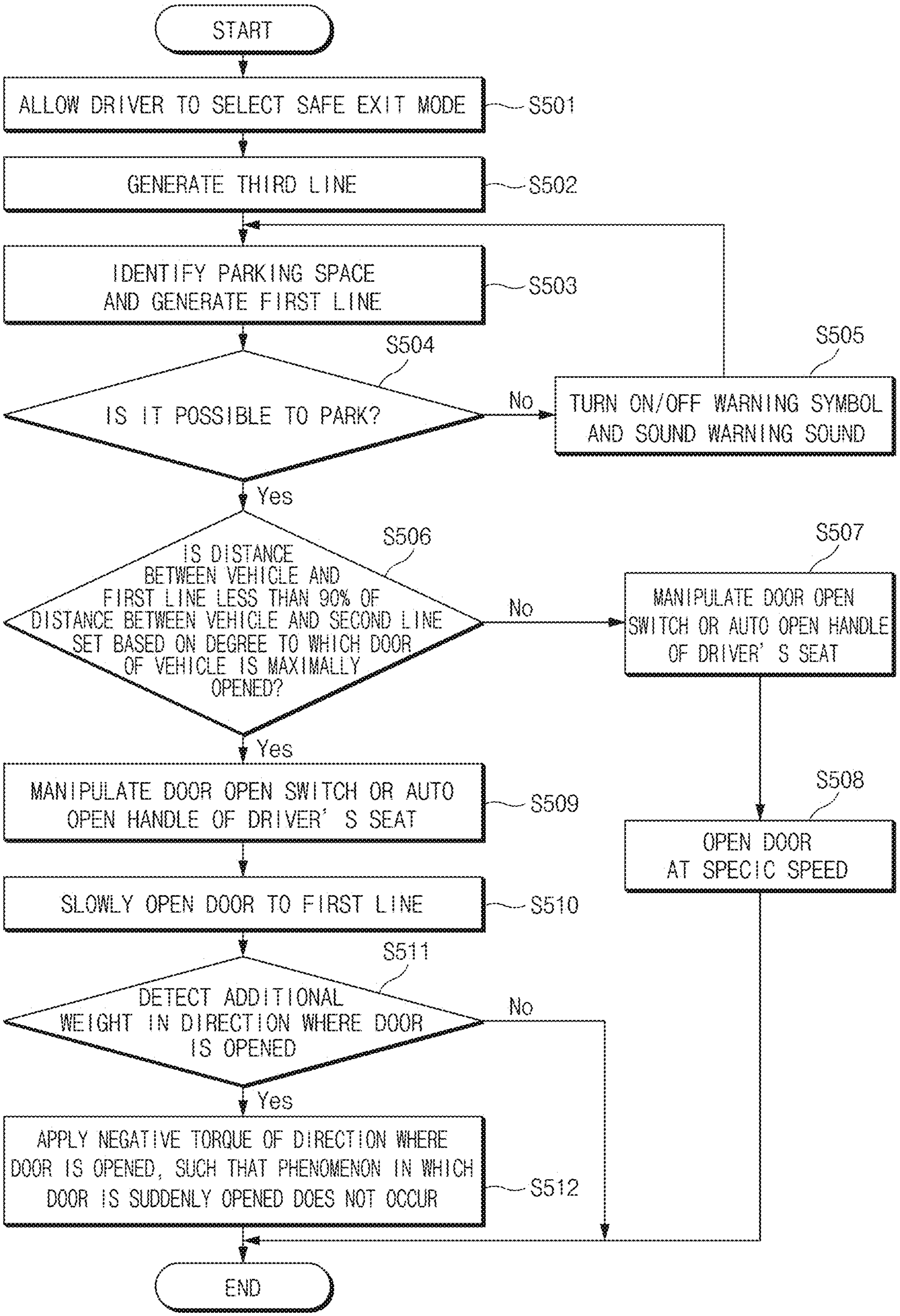
FIG. 5 is a flowchart illustrating a process of controlling a speed of a door when opening the door of the driver's seat in an automatic mode in a passenger safe exit assist device according to an embodiment of the present disclosure.

FIG. 5 is a flowchart illustrating a process of controlling a speed of a door when opening the door of the driver's seat in an automatic mode in a passenger safe exit assist device according to an embodiment of the present disclosure.

Referring to FIG. 5, in S501, a passenger safe exit assist device 100 of FIG. 1 may determine that a driver selects a safe exit mode.

After determining that the driver selects the safe exist mode, in S502, the passenger safe exit assist device 100 may generate a third line.

After generating the third line, in S503, the passenger safe exit assist device 100 may identify a parking space and may generate a first line.

After identifying the parking space and generating the first line, in S504, the passenger safe exit assist device 100 may determine whether it is possible to park.

When it is determined that it is impossible to park, in S505, the passenger safe exit assist device 100 may turn on/off a warning symbol and may sound a warning sound.

After turning on/off the warning symbol and sounding the warning sound, the passenger safe exit assist device 100 may perform S503 again.

Because S501 to S505 are the same as S301 to S305 of FIG. 3, a detailed description thereof is omitted.

When it is determined that it is possible to park, in S506, the passenger safe exit assist device 100 may determine whether the distance between the vehicle and the first line is less than 90% of a distance between the vehicle and a second line set based on a degree to which the door of the vehicle is maximally opened.

As an example, a controller 220 of FIG. 2 may determine whether the ratio of the distance between the vehicle and the first line to the distance between the vehicle and the second line set based on the degree to which the door is maximally opened is greater than a second reference ratio.

Herein, the numerical value 90% may be a value set randomly to give an example of the second reference ratio and may be actually set to the same value as the first reference ratio or may be set to a value different from the first reference ratio.

When it is determined that the distance between the vehicle and the first line is not less than 90% of the distance between the vehicle and the second line, in S507, the passenger safe exit assist device 100 may determine that the door open switch or the auto open handle of the driver's seat is manipulated.

As an example, the controller 220 may determine that the door open switch or the auto open handle of the driver's seat is manipulated, by means of an automatic door opening input device 252 of FIG. 2.

After determining that the door open switch or the auto open handle of the driver's seat is manipulated, in S508, the passenger safe exit assist device 100 may control such that the door of the driver's seat is opened at a specific speed.

As an example, the controller 220 may automatically open the door of the driver's seat to the first line, depending on a signal for automatically opening the door of the driver's seat.

As an example, when it is determined that the distance between the vehicle and the first line is not less than 90% of the distance between the vehicle and the second line and when it is determined that the door open switch or the auto open handle of the driver's seat is manipulated, the passenger safe exit assist device 100 may control such that the door of the driver's seat is opened at a specific speed previously stored in a memory.

When it is determined that the distance between the vehicle and the first line is less than 90% of the distance between the vehicle and the second line, in S509, the passenger safe exit assist device 100 may determine that the door open switch or the auto open handle of the driver's seat is manipulated.

As an example, the controller 220 may determine that the door open switch or the auto open handle of the driver's seat is manipulated, by means of the automatic door opening input device 252, in the same manner as that in S507.

After determining that the door open switch or the auto open handle of the driver's seat is manipulated, in S510, the passenger safe exit assist device 100 may control such that the door is opened slowly to the first line.

As an example, the controller 220 may control such that the door of the driver's seat is opened to the first line at a predetermined speed, depending on the ratio of the distance between the vehicle and the first line to the distance between the vehicle and the second line.

As an example, when the ratio of the distance between the vehicle and the first line to the distance between the vehicle and the second line is less than or equal to 60% compared to being less than or equal to 80%, the controller 220 may control such that the door of the driver's seat is opened to the first line at a lower predetermined speed.

After controlling such that the door is opened slowly to the first line, in S511, the passenger safe exit assist device 100 may determine whether an additional weight is detected in the direction where the door is opened.

As an example, the controller 220 may determine whether the additional weight is detected in the direction where the door is opened, by means of a door opening weight measuring device 215 of FIG. 2.

When it is determined that the additional weight is detected in the direction where the door is opened, in S512, the passenger safe exit assist device 100 may apply a negative torque of the direction where the door is opened, such that a phenomenon in which the door is suddenly opened does not occur.

As an example, the controller 220 may deliver a control signal to a door opening negative torque load device 230 of FIG. 2 and may assign torque in a direction opposite to the direction where the door of the driver's seat is opened, such that the phenomenon in which the door is suddenly opened does not occur.

Figure 6:
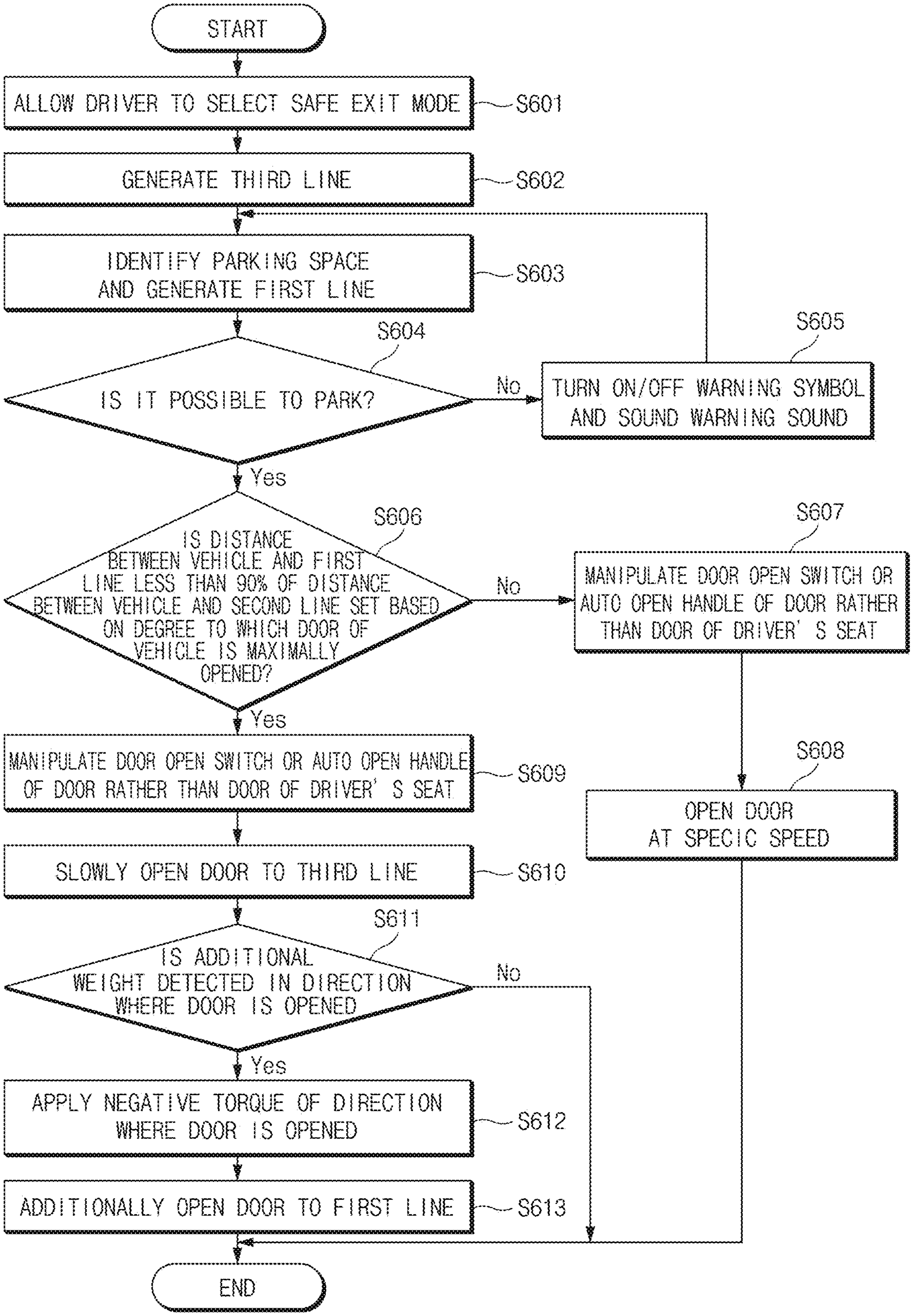
FIG. 6 is a flowchart illustrating a process of controlling a speed of a door when opening a different door rather than the door of the driver's seat in an automatic mode in a passenger safe exit assist device according to an embodiment of the present disclosure.

FIG. 6 is a flowchart illustrating a process of controlling a speed of a door when opening a door rather than the door of the driver's seat, i.e., a different door, in an automatic mode in a passenger safe exit assist device according to an embodiment of the present disclosure.

Referring to FIG. 6, in S601, a passenger safe exit assist device 100 of FIG. 1 may determine that a driver selects a safe exit mode.

After determining that the driver selects the safe exist mode, in S602, the passenger safe exit assist device 100 may generate a third line.

After generating the third line, in S603, the passenger safe exit assist device 100 may identify a parking space and may generate a first line.

After identifying the parking space and generating the first line, in S604, the passenger safe exit assist device 100 may determine whether it is possible to park.

When it is determined that it is impossible to park, in S605, the passenger safe exit assist device 100 may turn on/off a warning symbol and may sound a warning sound.

After turning on/off the warning symbol and sounding the warning sound, the passenger safe exit assist device 100 may perform S603 again.

When it is determined that it is possible to park, in S606, the passenger safe exit assist device 100 may determine whether a distance between the vehicle and the first line is less than 90% of a distance between the vehicle and a second line.

Because S601 to S606 are the same as S501 to S506 of FIG. 5, a detailed description thereof is omitted.

When it is determined that the distance between the vehicle and the first line is not less than 90% of the distance between the vehicle and the second line, in S607, the passenger safe exit assist device 100 may determine that a door open switch or an auto open handle of a door rather than the door of the driver's seat, i.e., the different door, is manipulated.

As an example, the controller 220 may determine that the door open switch or the auto open handle of the different door rather than the door of the driver's seat is manipulated, by means of an automatic door opening input device 252 of FIG. 2.

After determining that the door open switch or the auto open handle of the different door rather than the door of the driver's seat is manipulated, in S608, the passenger safe exit assist device 100 may control such that the different door rather than the door of the driver's seat is opened at a specific speed.

As an example, the controller 220 may automatically open the different door rather than the door of the driver's seat to the third line, depending on a signal for automatically opening the different door rather than the door of the driver's seat.

When it is determined that the distance between the vehicle and the first line is not less than 90% of the distance between the vehicle and the second line and when it is determined that the door open switch or the auto open handle of the different door rather than the door of the driver's seat is manipulated, the controller 220 may control such that the different door rather than the door of the driver's seat is opened at a specific speed previously stored in a memory.

When it is determined that the distance between the vehicle and the first line is less than 90% of the distance between the vehicle and the second line, in S609, the passenger safe exit assist device 100 may determine that the door open switch or the auto open handle of the different door rather than the door of the driver's seat is manipulated.

As an example, the controller 220 may determine that the door open switch or the auto open handle of the different door rather than the door of the driver's seat is manipulated, by means of the automatic door opening input device 252, in the same manner as that in S607.

After determining that the door open switch or the auto open handle of the different door rather than the door of the driver's seat is manipulated, in S610, the passenger safe exit assist device 100 may control such that the different door is opened slowly to the third line.

As an example, the controller 220 may control such that the different door rather than the door of the driver's seat is opened to the first line at a predetermined speed, depending on the ratio of the distance between the vehicle and the first line to the distance between the vehicle and the second line.

After controlling such that the different door is opened slowly to the third line, in S611, the passenger safe exit assist device 100 may determine whether an additional weight is detected in the direction where the different door is opened.

As an example, the controller 220 may determine whether the additional weight is detected in the direction where the different door is opened, by means of a door opening weight measuring device 215 of FIG. 2.

When it is determined that the additional weight is detected in the direction where the door is opened, in S612, the passenger safe exit assist device 100 may apply a negative torque of the direction where the different door is opened.

As an example, the controller 220 may deliver a control signal to a door opening negative torque load device 230 of FIG. 2 and may assign torque in a direction opposite to the direction where the different door rather than the door of the driver's seat is opened, such that the phenomenon in which the different door is suddenly opened does not occur.

After assigning the negative torque of the direction where the different door is opened, in S613, the passenger safe exit assist device 100 may control such that the different door is additionally opened to the first line.

As an example, the controller 220 may reflect the will of the passenger to control to additionally open the different door rather than the door of the driver's seat to the first line.

Figure 7:
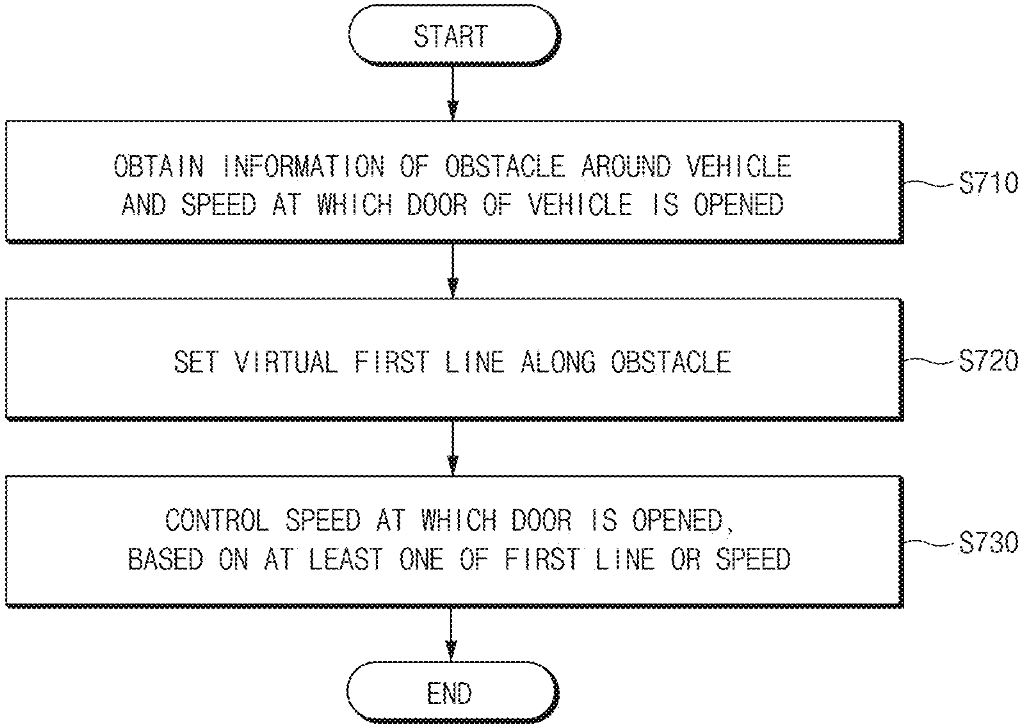
FIG. 7 is a flowchart illustrating a passenger safe exit assist method according to an embodiment of the present disclosure.

FIG. 7 is a flowchart illustrating a passenger safe exit assist method according to an embodiment of the present disclosure.

Referring to FIG. 7, the passenger safe exit assist method may include obtaining (S710) information of an obstacle around a vehicle and a speed at which a door of the vehicle is opened, setting (S720) a virtual first line along the obstacle, and controlling (S730) the speed at which the door is opened, based on at least one of the first line or the speed.

The obtaining (S710) of the information of the obstacle around the vehicle and the speed at which the door of the vehicle is opened may be performed by means of a vehicle side state and distance measuring device 211 and a door opening speed measuring device 213 of a sensor device 210 of FIG. 2.

The setting (S720) of the virtual first line along the obstacle may be performed in a process of assisting parking or may be performed by a controller 220 of FIG. 2 using an image obtained by means of the sensor device 210 through a separate process.

The controlling (S730) of the speed at which the door is opened based on the at least one of the first line or the speed may be performed by means of the controller 220 and a door opening negative torque load device 230 of FIG. 2.

As an example, the controlling (S730) of the speed at which the door is opened based on the at least one of the first line or the speed may include determining whether to control the speed at which the door is opened, depending on whether the ratio of a distance between the vehicle and the first line to a distance between the vehicle and a second line set based on a degree to which the door of the vehicle is maximally opened.

As an example, the controlling (S730) of the speed at which the door is opened based on the at least one of the first line or the speed may include applying torque in a direction opposite to a direction where the door is opened to control the speed at which the door is opened, when the speed is greater than a reference speed, and increasing torque in the direction opposite to the direction where the door is opened depending to a degree to which the door is opened, when acceleration is greater than reference acceleration.

As an example, the controlling (S730) of the speed at which the door is opened based on the at least one of the first line or the speed may include opening the door of the driver's seat at a specific speed, when the ratio of the distance between the vehicle and the first line to the distance between the vehicle and the second line set based on the degree to which the door of the vehicle is maximally opened is greater than a second reference ratio, depending on a signal for automatically opening the door of the driver's seat. The controlling (S370) of the speed at which the door is opened may also include opening the door of the driver's seat at a predetermined speed depending on the ratio of the distance between the vehicle and the first line to the distance between the vehicle and the second line, when the ratio of the distance between the vehicle and the first line to the distance between the vehicle and the second line is not greater than the second reference ratio, depending on the signal for automatically opening the door of the driver's seat. The controlling (S370) of the speed at which the door is opened may also include applying torque in the direction opposite to the direction where the door of the driver's seat is opened, when a force is applied in the direction where the door of the driver's seat is opened, in a state where the door of the driver's seat is opened to the first line.

As an example, the controlling (S730) of the speed at which the door is opened based on the at least one of the first line or the speed may include automatically opening a different door rather than the door of the driver's seat to a third line, depending on a signal for automatically opening the different door rather than the door of the driver's seat. The controlling (S370) of the speed at which the door is opened may also include applying torque in a direction opposite to a direction where the different door rather than the door of the driver's seat is opened to open the different door rather than the door of the driver's seat to the first line, when a force is applied in the direction where the different door rather than the door of the driver's seat is opened, in a state where the different door rather than the door of the driver's seat is opened to the third line.

A description is given of effects of the passenger safe exit assist device and the method thereof according to an embodiment of the present disclosure.

According to at least one of the embodiments of the present disclosure, the passenger safe exit assist device and the method thereof may be provided to control an opening speed of the door when a passenger alights from the vehicle to assist the passenger to alight safely.

Furthermore, according to at least one of the embodiments of the present disclosure, the passenger safe exit assist device and the method thereof may be provided to control a speed at which the door is opened, when the passenger manually opens the door when the passenger alights from the vehicle to prevent the door from being damaged due to a collision between the door and the surrounding obstacle.

Furthermore, according to at least one of the embodiments of the present disclosure, the passenger safe exit assist device and the method thereof may be provided to set a parking assist line depending on a degree to which the door is opened, which is determined according to a driver, thus providing convenience in the process of opening the door when the driver alights.

Furthermore, according to at least one of the embodiments of the present disclosure, the passenger safe exit assist device and the method thereof may be provided to allow the driver to select a mode where a degree to which the door is opened is differently set, depending on a situation, and may adjust the degree to which the door is opened when the driver alights depending on the mode selected by the driver.

Furthermore, according to at least one of the embodiments of the present disclosure, the passenger safe exit assist device and the method thereof may be provided to conveniently select the mode in various methods, in the process where the driver selects the mode where the degree to which the door is opened is differently set.

In addition, various effects ascertained directly or indirectly through the present disclosure may be provided.

Hereinabove, although the present disclosure has been described with reference to several embodiments and the accompanying drawings, the present disclosure is not limited thereto. The embodiments and the disclosure may be variously modified and altered by those having ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A passenger safe exit assist device, comprising:

a sensor device configured to obtain information of an obstacle around a vehicle and a speed at which a door of the vehicle is opened; and a controller configured to set a virtual first line along the obstacle and control the speed at which the door is opened, based on at least one of the first line or the speed, wherein the controller applies torque in a direction opposite to a direction where the door is opened to control the speed at which the door is opened, when the speed is greater than a reference speed.

2. The passenger safe exit assist device of claim 1, wherein the controller determines whether to control the speed at which the door is opened, depending on whether the ratio of a distance between the vehicle and the first line to a distance between the vehicle and a second line set based on a degree to which the door is maximally opened is greater than a first reference ratio.

3. The passenger safe exit assist device of claim 1, wherein the sensor device obtains an acceleration at which the door is opened, and wherein the controller increases the torque in the direction opposite to the direction where the door is opened, depending on a degree to which the door is opened, when the acceleration is greater than reference acceleration.

4. The passenger safe exit assist device of claim 1, wherein the controller automatically opens a door of the driver's seat to the first line, depending on a signal for automatically opening the door of the driver's seat.

5. The passenger safe exit assist device of claim 4, wherein the controller opens the door of the driver's seat at a specific speed, when the ratio of a distance between the vehicle and the first line to a distance between the vehicle and a second line set based on a degree to which the door is maximally opened is greater than a second reference ratio, and wherein the controller opens the door of the driver's seat at a predetermined speed depending on the ratio of the distance between the vehicle and the first line to the distance between the vehicle and the second line, when the ratio of the distance between the vehicle and the first line to the distance between the vehicle and the second line is not greater than the second reference ratio.

6. The passenger safe exit assist device of claim 4, wherein the controller controls to apply torque in a direction opposite to a direction where the door of the driver's seat is opened, when a force is applied in the direction where the door of the driver's seat is opened, in a state where the door of the driver's seat is opened to the first line.

7. The passenger safe exit assist device of claim 1, wherein the controller sets a third line based on a degree to which the door is opened with regard to safe exit and automatically opens a different door rather than a door of the driver's seat to the third line, depending on a signal for automatically opening the different door.

8. The passenger safe exit assist device of claim 7, wherein the controller applies torque in a direction opposite to a direction where the different door is opened and opens the different door to the first line, when a force is applied in the direction where the different door is opened, in a state where the different door is opened to the third line.

9. The passenger safe exit assist device of claim 7, wherein the controller sets the third line based on a degree to which the different door is opened, the degree corresponding to a mode selected among a mode where the degree to which the door is opened is set according to a reference body type, a mode where the degree to which the door is opened is set according to a front body type of a driver, and a mode where the degree to which the door is opened is set according to a side body type of the driver.

10. The passenger safe exit assist device of claim 9, wherein the degree to which the different door is opened includes the degree being calculated such that an area in which the reference body type or the front body type is reflected passes, when the mode where the degree to which the door is opened is set according to the reference body type or the front body type of the driver is selected, and wherein the controller sets the third line based on the degree to which the door is opened, the degree corresponding to the selected mode, and a degree to which the door is additionally opened, the degree being set to prevent a contact with an obstacle when the door is opened.

11. The passenger safe exit assist device of claim 10, wherein the controller sets the third line based on only a degree to which the different door is opened according to the side body type of the driver without regard to a distance between the vehicle and the obstacle, when the mode where the degree to which the door is opened is set according to the side body type of the driver is selected.

12. The passenger safe exit assist device of claim 9, wherein the controller sets the selected mode by means of at least one of the number of times a mode selection button is pushed, a time when the mode selection button is pushed, or a user selection mode (USM).

13. The passenger safe exit assist device of claim 9, wherein the controller stores body type information according to a user in a memory and sets the degree to which the different door is opened according to the front body type of the driver and the degree to which the door is opened according to the side body type of the driver, using the body type information stored in the memory.

14. A passenger safe exit assist method, comprising:

obtaining information of an obstacle around a vehicle and a speed at which a door of the vehicle is opened;

setting a virtual first line along the obstacle; and controlling the speed at which the door is opened, based on at least one of the first line or the speed, wherein controlling the speed at which the door is opened, based on the at least one of the first line or the speed, includes applying torque in a direction opposite to a direction where the door is opened to control the speed at which the door is opened, when the speed is greater than a reference speed.

15. The passenger safe exit assist method of claim 14, wherein controlling the speed at which the door is opened, based on the at least one of the first line or the speed includes:

determining whether to control the speed at which the door is opened, depending on whether the ratio of a distance between the vehicle and the first line to a distance between the vehicle and a second line set based on a degree to which the door of the vehicle is maximally opened is greater than a first reference ratio.

16. The passenger safe exit assist method of claim 14, further comprising:

obtaining acceleration at which the door is opened, wherein controlling the speed at which the door is opened, based on the at least one of the first line or the speed includes increasing the torque in the direction opposite to the direction where the door is opened, depending on a degree to which the door is opened, when the acceleration is greater than reference acceleration.

17. The passenger safe exit assist method of claim 14, wherein controlling the speed at which the door is opened, based on the at least one of the first line or the speed includes:

opening the door of the driver's seat at a specific speed, when the ratio of a distance between the vehicle and the first line to a distance between the vehicle and a second line set based on a degree to which the door is maximally opened is greater than a second reference ratio, depending on a signal for automatically opening the door of the driver's seat;

opening the door of the driver's seat at a predetermined speed depending on the ratio of the distance between the vehicle and the first line to the distance between the vehicle and the second line, when the ratio of the distance between the vehicle and the first line to the distance between the vehicle and the second line is not greater than the second reference ratio, depending on the signal for automatically opening the door of the driver's seat; and applying torque in a direction opposite to a direction where the door of the driver's seat is opened, when a force is applied in the direction where the door of the driver's seat is opened, in a state where the door of the driver's seat is opened to the first line.

18. The passenger safe exit assist method of claim 14, further comprising:

setting a third line based on a degree to which the door is opened with regard to safe exit, wherein controlling the speed at which the door is opened, based on the at least one of the first line or the speed includes automatically opening a different door rather than a door of the driver's seat to the third line, depending on a signal for automatically opening the different door; and applying torque in a direction opposite to a direction where the different door is opened and opening the different door to the first line, when a force is applied in the direction where the different door is opened, in a state where the different door is opened to the third line.

19. The passenger safe exit assist method of claim 18, wherein setting the third line based on the degree to which the door is opened with regard to the safe exit includes:

setting the third line based on a degree to which the different door is opened, the degree corresponding to a mode selected among a mode where the degree to which the door is opened is set according to a reference body type, a mode where the degree to which the door is opened is set according to a front body type of a driver, and a mode where the degree to which the door is opened is set according to a side body type of the driver.

20. A passenger safe exit assist device, comprising:

a sensor device configured to obtain information of an obstacle around a vehicle and a speed at which a door of the vehicle is opened; and a controller configured to set a virtual first line along the obstacle and control the speed at which the door is opened, based on at least one of the first line or the speed, wherein the controller automatically opens a door of the driver's seat to the first line, depending on a signal for automatically opening the door of the driver's seat.

* * * * *